(12) United States Patent
Pamu et al.

(10) Patent No.: US 12,170,643 B2
(45) Date of Patent: *Dec. 17, 2024

(54) APPLICATION ROUTING INFRASTRUCTURE FOR PRIVATE-LEVEL REDIRECT TRAPPING AND CREATION OF NAT MAPPING TO WORK WITH CONNECTIVITY IN CLOUD AND CUSTOMER NETWORKS

(71) Applicant: Oracle International Corporation, Redwood Shores, CA (US)

(72) Inventors: Srinivas Pamu, Bengaluru (IN); Feroz Alam Khan, Bangalore (IN); Kant C. Patel, Fremont, CA (US)

(73) Assignee: Oracle International Corporation, Redwood Shores (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/244,815

(22) Filed: Sep. 11, 2023

(65) Prior Publication Data

US 2024/0080296 A1    Mar. 7, 2024

Related U.S. Application Data

(63) Continuation of application No. 17/805,449, filed on Jun. 3, 2022, now Pat. No. 11,792,153.

(51) Int. Cl.
*H04L 61/25* (2022.01)
*H04L 45/64* (2022.01)
(Continued)

(52) U.S. Cl.
CPC .......... *H04L 61/255* (2013.01); *H04L 45/64* (2013.01); *H04L 61/251* (2013.01)

(58) Field of Classification Search
CPC ...... H04L 6/255; H04L 45/64; H04L 61/2517
See application file for complete search history.

(56) References Cited

U.S. PATENT DOCUMENTS

| 8,751,691 B1 * | 6/2014 | Brandwine | ......... H04L 61/2592 |
| | | | 709/250 |
| 11,792,153 B1 * | 10/2023 | Pamu | .................. H04L 61/2514 |
| | | | 370/392 |

(Continued)

OTHER PUBLICATIONS

Notice of Allowance for U.S. Appl. No. 17/805,449 dated Jun. 9, 2023.

*Primary Examiner* — Brenda H Pham
(74) *Attorney, Agent, or Firm* — Vista IP Law Group, LLP

(57) ABSTRACT

A computer program product, system, and computer implemented method for application-level redirect trapping and creation of NAT mapping to work with routing infrastructure for private connectivity in cloud and customer networks. The approach disclosed herein generally comprises a method of leveraging a reverse connection endpoint and IP address mapping controller to capture redirection messages from a private cloud or network (e.g., a service consumer network or a service consumer hybrid cloud). This allows at least the IP address mapping controller to manage a cloud networking infrastructure to provide for a service provider network (e.g., a public cloud) to support applications that overcome the isolation requirements of a private cloud or network to perform useful work. For example, without saddling the private cloud or network user with a heavy pre-configuration burden, the approach disclosed herein supports redirection to dynamically determined IP addresses at the private cloud or network.

20 Claims, 13 Drawing Sheets

(51) Int. Cl.
 *H04L 61/251* (2022.01)
 *H04L 61/255* (2022.01)

(56) References Cited

U.S. PATENT DOCUMENTS

2016/0197933 A1 7/2016 Lapidous et al.
2022/0116323 A1 4/2022 Tracy et al.

* cited by examiner

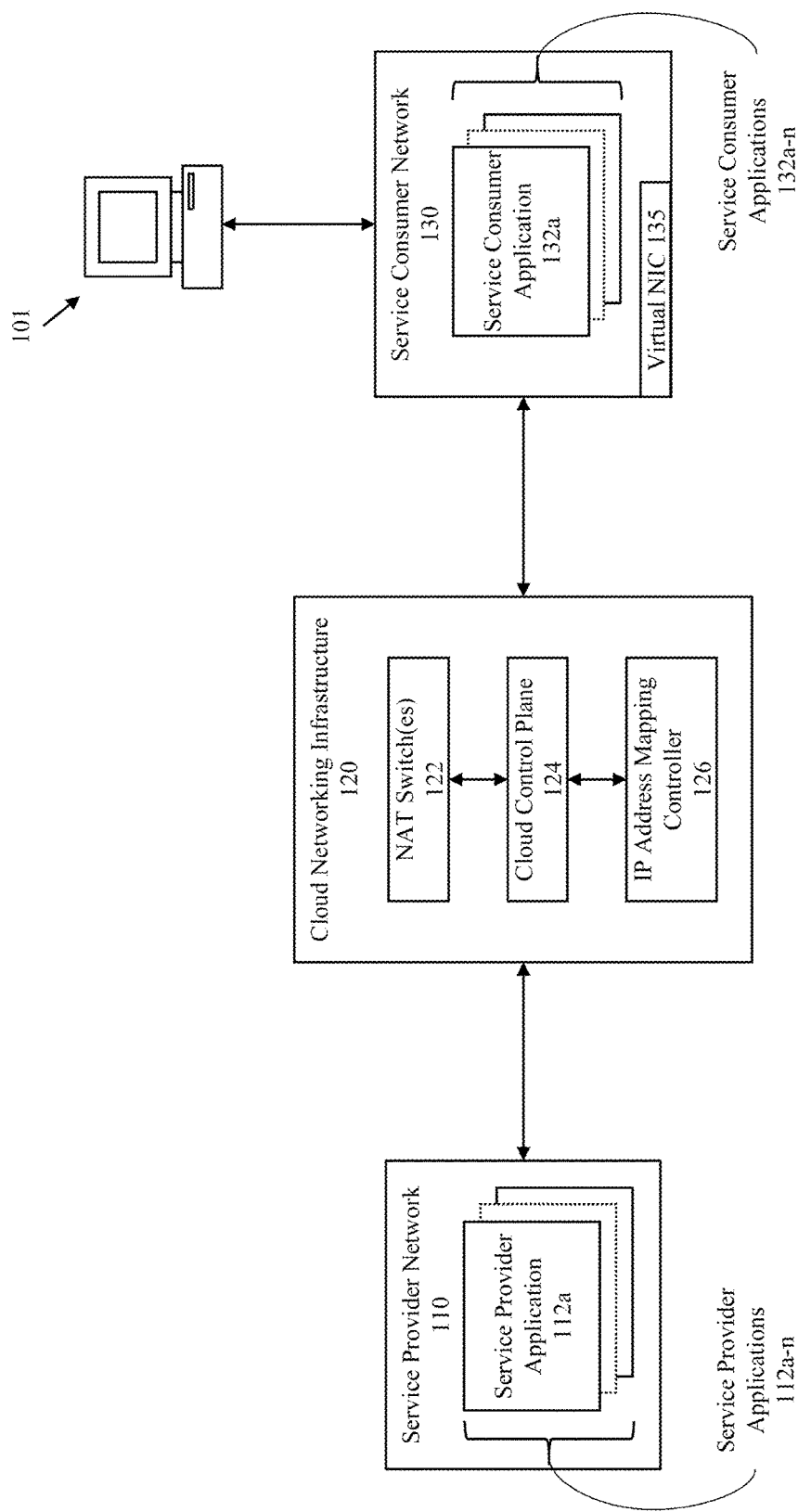
FIG. 1A1

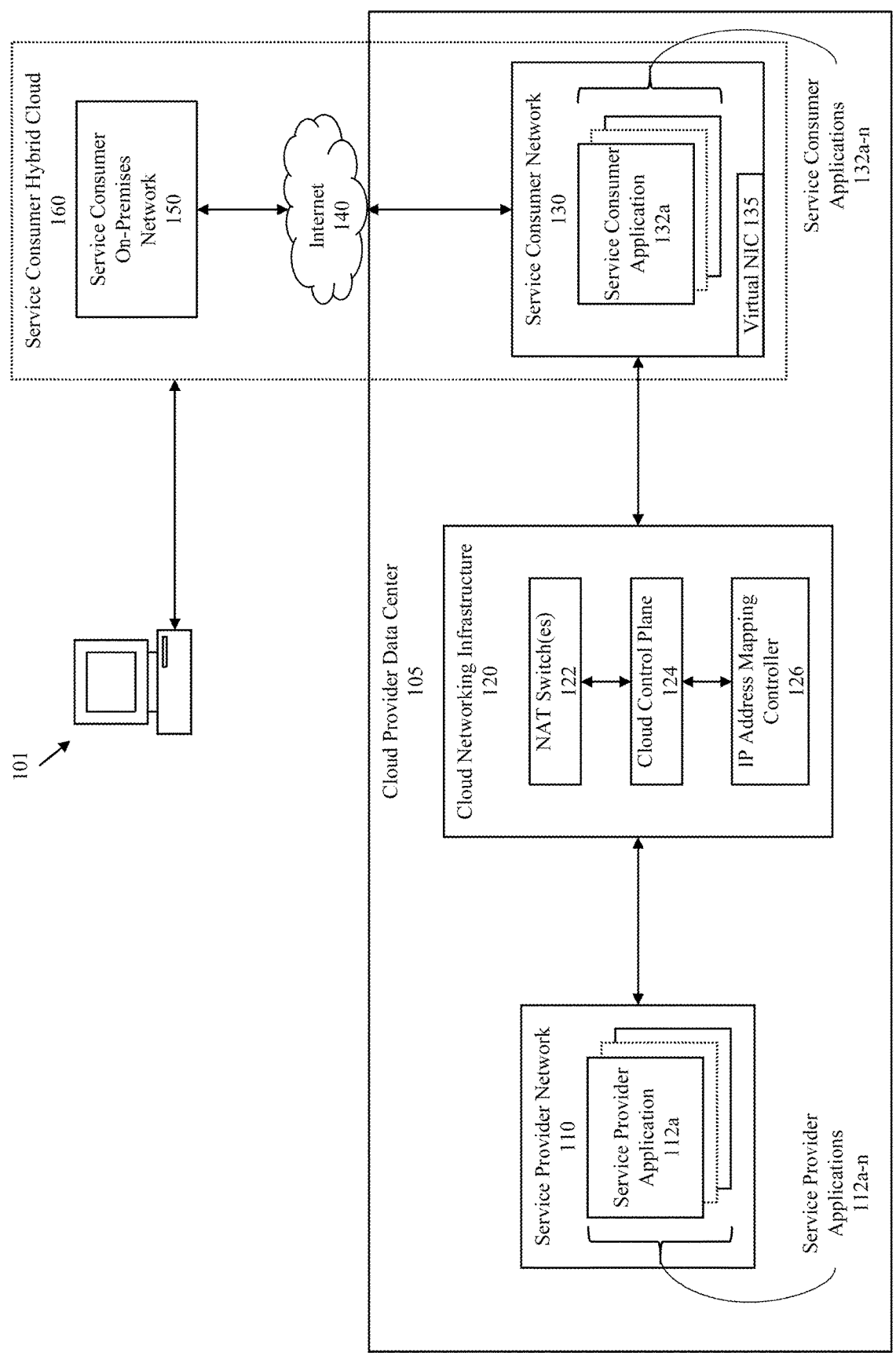
FIG. 1A2

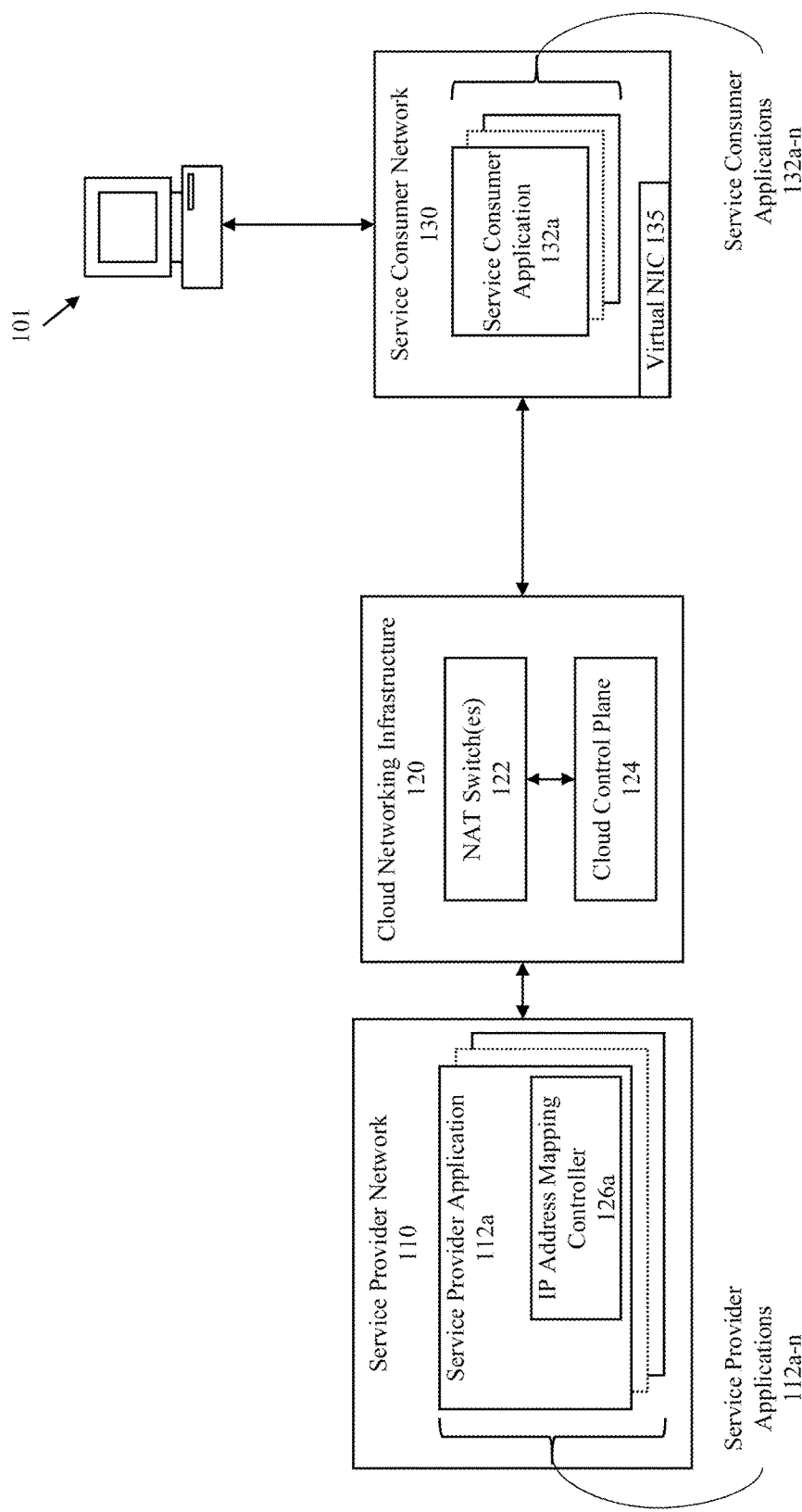
FIG. 1B1

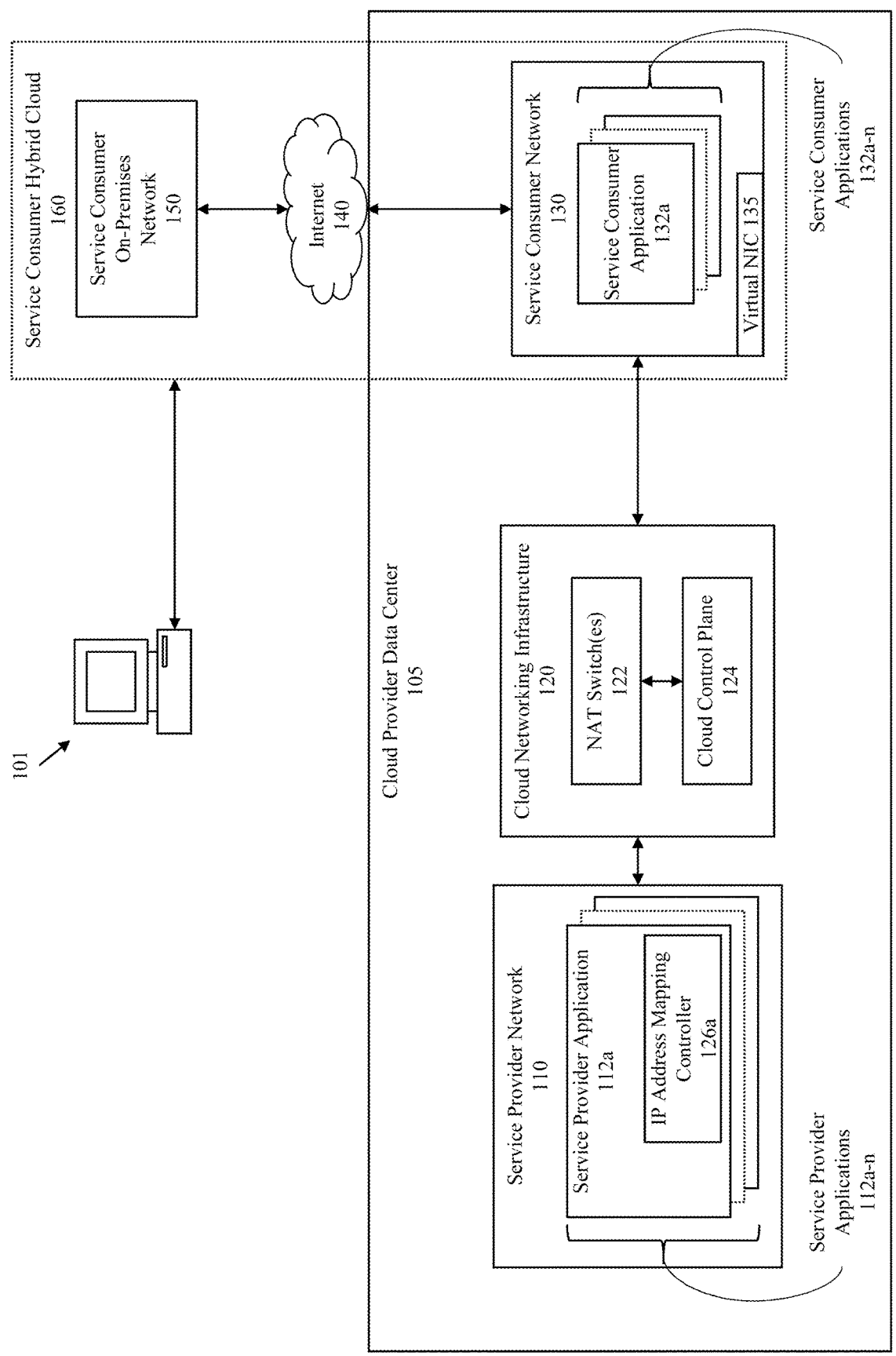
FIG. 1B2

APPLICATION ROUTING INFRASTRUCTURE FOR PRIVATE-LEVEL REDIRECT TRAPPING AND CREATION OF NAT MAPPING TO WORK WITH CONNECTIVITY IN CLOUD AND CUSTOMER NETWORKS

RELATED APPLICATION

This application is a continuation of U.S. patent application Ser. No. 17/805,449 filed on Jun. 3, 2022, now U.S. Pat. No. 11,792,153. The entirety of the above applications is hereby incorporated herein by reference.

BACKGROUND

Historically, companies operated their own computing network with computing services being provided within their computing network. However, with the rise of cloud computing many companies operate in a hybrid cloud approach where a private network or cloud is maintained (by the company or by a private cloud provider), and a public cloud is used to provide additional services (e.g., from a public cloud provider). For example, a public cloud could be used to provide one or more computing services (e.g., applications) in the public cloud that may operate on data that may be maintained in the private network or cloud.

Unfortunately, interfacing with the services can be challenging at least because of the network isolation and access controls between the private network or cloud and a public cloud. In particular, current approaches allow for opening connections by the private network or cloud to the public cloud, but do not allow the public cloud to initiate connections with a private network or cloud. This is generally for the purposes of maintaining network security at the private network or cloud. This is undesirable at least because the end-user experience is degraded when barriers are placed in the way of using services (e.g., applications in the public cloud).

One approach to address the network isolation issue is to utilize a virtual networking card (vNIC) at the customer network to offer network connectivity between the public and the private networks. Using a vNIC can allow for a reverse connection endpoint (RCE) which enables the public cloud to connected through a preconfigured address within the private network or cloud. Generally, this approach is accomplished by providing a vNIC at the public cloud provider and another vNIC at the private network or cloud, where communications received at each vNIC are automatically routed to the other vNIC. This allows service providers to offer a reverse connection endpoint to connect into a customer's network.

Generally, the reverse connection endpoint (RCE) approach works fine when communication for a given client/pair happens over the same/initial connection. However, when that initial connection results in one or more other connections (e.g., due to call redirects) to a different target in a customer network, the RCE approach is insufficient to provide the desired functionality. For example, a load balancing operation at the private network or cloud may result in a redirect to a different target within a private network or cloud which is not associated with an RCE. When this happens, it results in a network connection failure because there is no RCE for the different target and thus the cloud provider does not know how to route the communication. Such issues often arise when one connection from the private network or cloud is used to interact with an application at the public cloud, that in turn operates on data within the private network or cloud.

Therefore, there is a need for an improved approach to manage routing for private connectivity in cloud and customer networks.

SUMMARY

Embodiments of the present disclosure provide a method, apparatus, and product for application-level redirect trapping and creation of NAT mapping to work with routing infrastructure for private connectivity in cloud and customer networks.

The approach disclosed herein generally comprises a method of leveraging a reverse connection endpoint and IP address mapping controller to capture redirection messages from a private cloud or network (e.g., a service consumer network or a service consumer hybrid cloud). This allows at least the IP address mapping controller to manage a cloud networking infrastructure to provide for a service provider network (e.g., a public cloud) to support applications that overcome the isolation requirements of a private cloud or network to perform useful work. For example, without saddling the private cloud or network user with a heavy pre-configuration burden, the approach disclosed herein supports redirection to dynamically determined IP addresses at the private cloud or network.

Further details of aspects, objects and advantages of the disclosure are described below in the detailed description, drawings, and claims. Both the foregoing general description and the following detailed description are exemplary and explanatory and are not intended to be limiting as to the scope of the disclosure.

BRIEF DESCRIPTION OF THE DRAWINGS

The drawings illustrate the design and utility of embodiments of the present disclosure, in which similar elements are referred to by common reference numerals. To better appreciate the advantages and objects of embodiments of the disclosure, reference should be made to the accompanying drawings. However, the drawings depict only certain embodiments of the disclosure, and should not be taken as limiting the scope of the disclosure. The drawings use like reference numerals to identify like elements, and unless otherwise specified, any description for that element may be applicable to each use of that reference numeral were appropriate.

FIG. 1A1-1B2 illustrate example systems in which some embodiments of the disclosure may be implemented.

FIG. 2 is a flowchart for application-level redirect trapping and creation of NAT mapping to work with routing infrastructure for private connectivity in cloud and customer networks according to some embodiments.

DETAILED DESCRIPTION OF THE EMBODIMENTS OF THE DISCLOSURE

Figure 2:
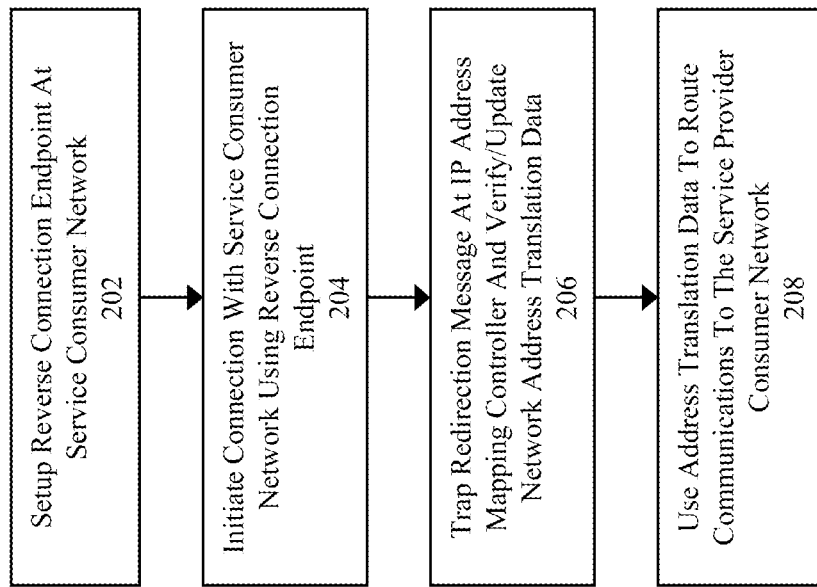

Various embodiments are described hereinafter with reference to the figures. It should be noted that the figures are not necessarily drawn to scale. It should also be noted that the figures are only intended to facilitate the description of the embodiment(s) and are not intended as an exhaustive description of the disclosure or as a limitation on the scope of the disclosure. In addition, an illustrated embodiment need not have all the aspects or advantages shown. An aspect or an advantage described in conjunction with a particular embodiment is not necessarily limited to that embodiment and can be practiced in any other embodiments even if not so illustrated.

FIG. 1A1-1B2 illustrate example systems in which some embodiments of the disclosure may be implemented.

FIG. 1A1 illustrates an example system according to some embodiments. As illustrated, the system comprises a service provider network, a service consumer network, and a cloud networking infrastructure. In some embodiments, the service provider network, the service consumer network, and the cloud networking infrastructure are provided by a cloud services vendor. In some embodiments, the service consumer network is a separately managed private cloud network within the service provider network with the underlying infrastructure being provided by the same company. Alternatively, the service consumer network might be provided by a first company (e.g., the service consumer or a cloud provider) with the service provider network and the cloud networking infrastructure being provided by another company different from the first company.

As illustrated, the system comprises a service provider network 110, cloud networking infrastructure 120, and a service consumer network 130. The service provider network 110 is interconnected to the service consumer network 130 through the cloud networking infrastructure 120. In some embodiments, the service provider network and the service consumer network are provided in different domains with independently selected IP addresses (e.g., addresses selected/allocated without processing to avoid IP address collisions between the two domains). In some embodiments, the cloud networking infrastructure 120 and the service consumer network 130 are interconnected over the internet. In some embodiments, the service provider network 110 and the service consumer network 130 are interconnected over a private network at least partially managed by the cloud networking infrastructure 120.

The service provider network 110 includes one or more service provider applications (e.g., 112a-n). Such applications can be provided to perform processing on behalf of one or more customers. For example, a service provider application might be provided to perform data analytics for customers of the cloud computing platform. Furthermore, data to be analyzed to provide the data analytics might be maintained at a service consumer network (e.g., see 130) where access to that data at a corresponding service consumer network is provided through the cloud networking infrastructure 120.

In some embodiments, the cloud networking infrastructure 120 provides a mechanism to communicate with the service consumer network 130. For example, the cloud networking infrastructure 120 includes one or more logical or physical network address translation switches 122 for routing communications over a plurality of data paths to provide for communication between resources of the provider and respective consumers. The cloud networking infrastructure 120 may also comprise a cloud control plane 124 which includes a mechanism for managing tables used in routing such as an address translation table. Furthermore, an IP address mapping controller 126 is provided to capture relevant information corresponding to possible changes to a collection of mapping table entries. For example, as will be discussed further below, the IP address mapping controller 126 may perform redirect message trapping and processing to determine whether an IP address mapping change should be performed. In some embodiments, the IP address mapping controller 126 provides notification to a corresponding entity of a mapped IP address.

The service consumer network 130 might comprise a private computing cloud or other private network. The service consumer network 130 may also include applications (e.g., service consumer applications 132a-n) that perform or can be used to perform computing tasks for users of the service consumer network. For instance, a user at a computing device 101 might connect to the service consumer network to report a trouble ticket issue or to interact with a customer relations system. Furthermore, as illustrated here, the service consumer network is configured with a virtual network interface card (virtual NIC or vNIC) 135 that is addressable by the service provider network 110 to initiate a connection with at least a subset of the service consumer network 130.

The computing device 101 interacts with the service consumer applications 132a-n at service consumer network. Furthermore, the computing devices might be controlled by a user, another service, an administrator, or comprise any other computing device that allows access to the service consumer network 130. The computing device 101 comprises any type of computing device that may be used to operate or interface with the service consumer network, whether directly or indirectly. Examples of such user computing devices 101 include workstations, personal computers, laptop computers, or remote computing terminals. User computing devices 101 may also comprise any type of portable tablet device, including for example, tablet computers and portable readers. User computing device 101 may also include mobile telephone devices relating to any mobile device that can suitably access any computing systems on the Internet such as smartphones and programmable mobile handsets. It is noted that the disclosure is not limited in its application to just these types of devices. The embodiments of the disclosure are applicable to any computing device that works in conjunction with access to digital information stored on, as an example, the Internet. One of ordinary skill in the art may appreciate that embodiments of this present disclosure may be implemented on the Internet, on a closed network, on a hybrid open and closed network, on a cloud network, or any combination thereof.

FIG. 1A2 illustrates an example system according to some embodiments comprising a service provider network, a service consumer network, and a cloud networking infrastructure. As illustrated, FIG. 1A2 adds a service consumer on-premises network arranged in a hybrid cloud with the service consumer network to the illustration of FIG. 1A1.

Since FIG. 1A2 is similar to FIG. 1A1, the descriptions of like number elements from FIG. 1A1 apply to the elements in FIG. 1A2.

FIG. 1A2 expands the illustration of FIG. 1A1 to include a service consumer hybrid cloud 160 that comprises at least the service consumer on-premises network 150 and the service consumer network 130 which may be interconnected over a network (e.g., see internet 140). As illustrated here, the service consumer network 130 portion of the service consumer hybrid cloud 160 is provided by the cloud provider data center 105 according to some embodiments. The service consumer on-premises network 150 may be provided by the service consumer—e.g., the entity using the cloud provided data center resources to provide for some of their computing needs. In some embodiments, the service consumer network 130 is provided by a cloud provider separate from a cloud provider providing the service provider network 110 and the cloud networking infrastructure 120. Additionally, as illustrated here, the computer device 101 is connected to the service consumer hybrid cloud 160 which may route connections to resources at the service consumer on-premises network 150 or the service consumer network 130.

FIG. 1B1 illustrates an example system according to some embodiments comprising a service provider network, a service consumer network, and a cloud networking infrastructure. In contrast to the illustration in FIG. 1A1, FIG. 1B1 moves the IP Address Mapping controller 126 to the service provider application (see 126a in service provider application 112a). Since FIG. 1B1 is otherwise similar to FIG. 1A1, the descriptions of like number elements from FIG. 1A1 applies to the elements in FIG. 1B1.

Additionally, while each service provider application 112a-n may include an IP address mapping controller instance (e.g., 126a-n), each IP address mapping controller 126a-n may perform the same functions discussed in regard to 126 but for each corresponding application. In this way, each service provider application can manage its own IP address mappings.

FIG. 1B2 illustrates an example system according to some embodiments comprising a service provider network, a service consumer network, and a cloud networking infrastructure. FIG. 1B2 combines the service consumer hybrid cloud 160 with the instance-based IP address mapping controllers 126a-n, both as discussed above in regard to FIGS. 1A2 and 1B1.

FIG. 2 is a flowchart for application-level redirect trapping and creation of NAT mapping to work with routing infrastructure for private connectivity in cloud and customer networks according to some embodiments. Generally, the processes comprises setting up a connection mechanism between a private cloud or network (see e.g., service consumer hybrid cloud 160, service consumer on-premises network 150, and service consumer network 130) and a public cloud or network (see e.g., service provider network 110) for the public cloud or network to allow the public cloud or network to request a connection to resources within the private cloud or network, where an underlying routing infrastructure is provider to capture redirect messages from the private cloud or network and maintain routing information necessary to provide for such communications.

For example, the process starts at 202 where a reverse connection endpoint (RCE) at a service consumer network is created. One possible approach to create a connection comprises providing a vNIC for receiving communications on an IP address associated with the reverse connection endpoint at the consumer network. In some embodiments, a corresponding vNIC is also provided at the public network to receive communications from the reverse connection endpoint. As disclosed herein, the vNIC(s) serve to receive communications from outside of the corresponding network (e.g., outside of the resource consumer or the resource provider networks), where those communications are subsequently processed as if they were received in the same way as communications originating from within the respective network.

At 204 a connection is initiated to a service consumer network using a corresponding RCE connection. As will be discussed further below, one approach might comprise sending a request to access a service where that request includes at least a service name identifying the service and may include additional metadata relevant to the request. Such a request is then routed by a mapping apparatus to a corresponding RCE interface via an IP address for that interface (e.g., the vNIC).

At 206 a redirection message is received from the corresponding RCE interface (e.g., transmitted using the vNIC). Such a message might be generated as a result of operations of a load balancer or other session facilitation process at the receiving network (e.g., at the private cloud or network). For instance, a connection request might be identified and a corresponding application instance from one or more instances of the same application (e.g., executing on different computer devices or nodes) is select to perform the corresponding processing based on a set of criteria corresponding to a current resource availability status (e.g., of CPU, memory, and I/O availability) of the one or more instances, based on metadata received in the request, or based on some combination thereof. Once identified, a corresponding IP address is provided in a redirection message to the requester over the vNIC. This message is then trapped at the IP address mapping controller for processing to verify or update an IP address mapping between an IP address in the service provider network and the provided address for the service consumer network. Generally, the IP addresses in the private cloud or network are managed separately from the IP addresses in the public cloud or network. As a result, the public and private clouds or networks may have address collisions and may not know how to route messages from one cloud or network to another cloud or network without more.

At 208 the application that caused the initiation of the connection with the service consumer network causes the use of the address translation data to route communications to the service provider consumer network. For example, the application causes the generation of one or more network packets directed to the service consumer network. The network packets are first addressed to the mapped IP address in the service provider network. The public cloud or network then translates the mapped IP address to the network address of the service consumer network before forwarding to the service consumer network (e.g., to the vNIC at the service consumer network). Such an approach provides a mechanism by which the service provider network can initiate connections to different nodes within a service consumer network, even when the service consumer network does not otherwise allow the provider network to initiate connections to the service consumer network.

Figure 3:
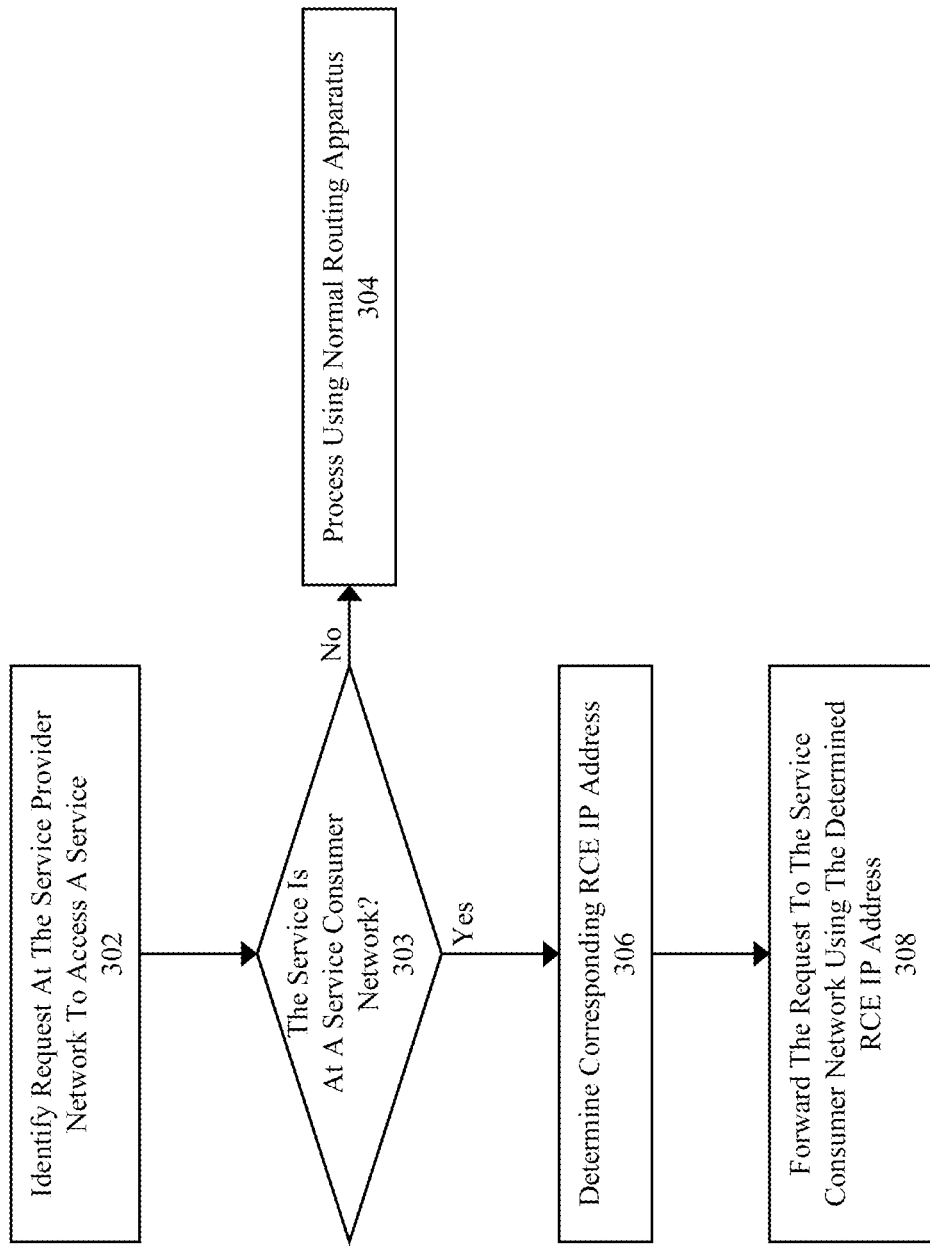
FIG. 3 is a more detailed flowchart for initiating a connection with a service consumer network using a reverse connection endpoint according to some embodiments.

FIG. 3 is a more detailed flowchart for initiating a connection with a service consumer network using a reverse connection endpoint according to some embodiments.

The process starts at 302 where a request to access a named service provider is identified at the service provider network. Generally, requests to process a service may be received in a form that identifies the service (e.g., by a service name) and may also identify a service provider. As an initial matter, such requests are formatted in this way to support multiple instances that can provide the service. Whereas if an IP address, e.g., a fixed IP address, is provided that service location is always the same and thus may be contrary to efforts to perform load balancing or siloing of requests for different users or clients to maintain security. Thus, as disclosed herein, a request is identified for processing to determine how it should be routed.

At 303, the request is processed at least to determine whether the named service is located at a service consumer network. For example, an application at the service provider network might send a request to access a database service at the service consumer network to perform data processing (e.g., data analytics). Such a process might be performed by the IP address mapping controller, 126 or 126a-n, by identifying metadata or a service name that identifies a service consumer network. In the event that the request is not determined to be to a service consumer network, the request is generally processed using the normal routing apparatus and configuration information for the public cloud or network at 304.

In the event that such the request is determined to be to a service consumer network at 303, the process performs a lookup operation to retrieve the RCE IP address for the service consumer network at 306. This RCE IP address is then used to forward the request, by the cloud networking infrastructure, using the RCE IP address of the corresponding vNIC (see 308). For example, the request from the application is encapsulated within a packet that is addressed to the vNIC using the RCE IP address. In some embodiments, an address replacement is also performed to cause any response to the request to be automatically routed back to the cloud provider infrastructure (e.g., to the IP address mapping controller 126 or any of 126a-n).

Figure 4:
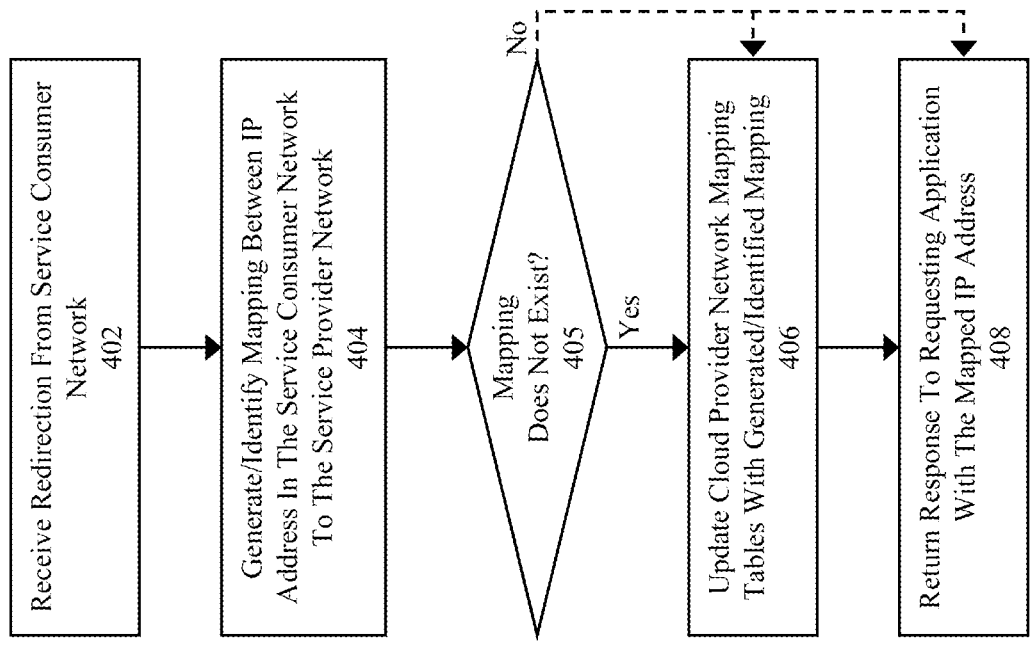
FIG. 4 is a more detailed flowchart for trapping redirection messages at a mapping controller and verifying/updating network address translation data according to some embodiments.

FIG. 4 is a more detailed flowchart for trapping redirection messages at a mapping controller and verifying/updating network address translation data according to some embodiments.

At 402, a redirection message from the service consumer network is received. Generally, a redirection message indicates a service and a corresponding IP address to be used to connect to an application instance at the service consumer network. Such an application instance might be identified using any approach such as those described herein.

At 404 a mapping between the received IP address of the application instance in the service consumer network to an IP address in the service provider network is generated. For example, an available IP address, (possibly one already associated with the requesting application) is mapped to the received IP address. In some embodiments, the available IP address is an IP address that was previously used in a mapping to the same or a different service in the same or a different service consumer network.

At 405 a determination is made as to whether theres is currently an existing mapping that is active in the cloud networking infrastructure. For example, a search (e.g., a lookup) against network address translation (NAT) switching tables is performed to determine whether there is currently an active mapping that matches the generated mapping.

If no matching mapping is identified, at 406, the process updates the corresponding mapping table[s] to include the generated mapping between the IP address in the service consumer network to the service provider network. In some embodiments, an expired mapping may be present in the mapping tables. In such an instance, the process may reactivate the mapping. If a matching mapping is identified at 405 then the process proceeds to 406 or 408. If the matching mapping includes an expiration time, then at 406, the mapping is updated to extend that expiration time. However, if the mapping is not associated with an expiration time the process proceeds to 408.

At 408, the mapped IP address is returned to the application for use in communicating with the service at the resource consumer network.

FIGS. 5A-5D illustrate an example flow to perform application-level redirect trapping and creation of NAT mapping to work with routing infrastructure for private connectivity in cloud and customer networks according to some embodiments.

Figure 5A:
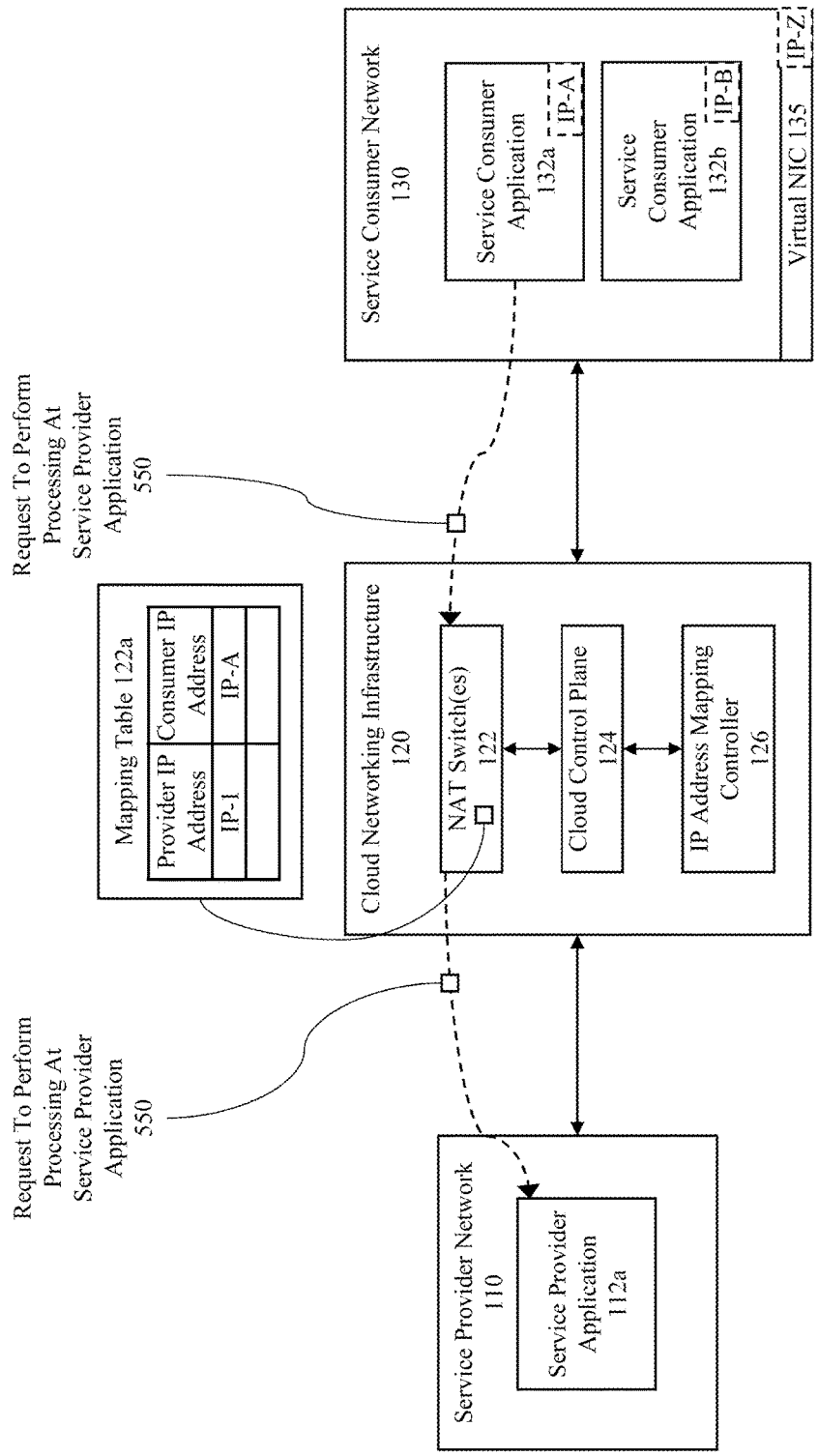
FIGS. 5A-5D illustrate an example flow to perform application-level redirect trapping and creation of NAT mapping to work with routing infrastructure for private connectivity in cloud and customer networks according to some embodiments.

FIG. 5A illustrates an initial example arrangement of a system. Generally, the example follows that of FIG. 1A1 and thus descriptions of items with matching identifiers as discussed above are applicable here. However, the example here is simplified in that only a single application (see service provider application 112a) is illustrated at the service provider network 110. Additionally, two applications (see service consumer applications 132a-b) are illustrated at the service consumer network 130 where each has a corresponding IP address (IP-A and IP-B respectively). Additionally, the service consumer network virtual NIC address is also an IP address used by the service provider network (IP-Z) to route communications to the service consumer network. Finally, a mapping table 122a is provided and as illustrated includes a mapping from IP-A in the service consumer network 130 to IP-1 in the service provider network 110.

According to some embodiments, the process disclosed herein may be initiated in response to a request from the service consumer network to perform processing at the service provider application that is received from the service consumer network and forward by the cloud networking infrastructure to the service provider network (see 550)— e.g., IP-A is mapped to IP-1 by the NAT switches to route the communication to the service provider application 112a.

Figure 5B:
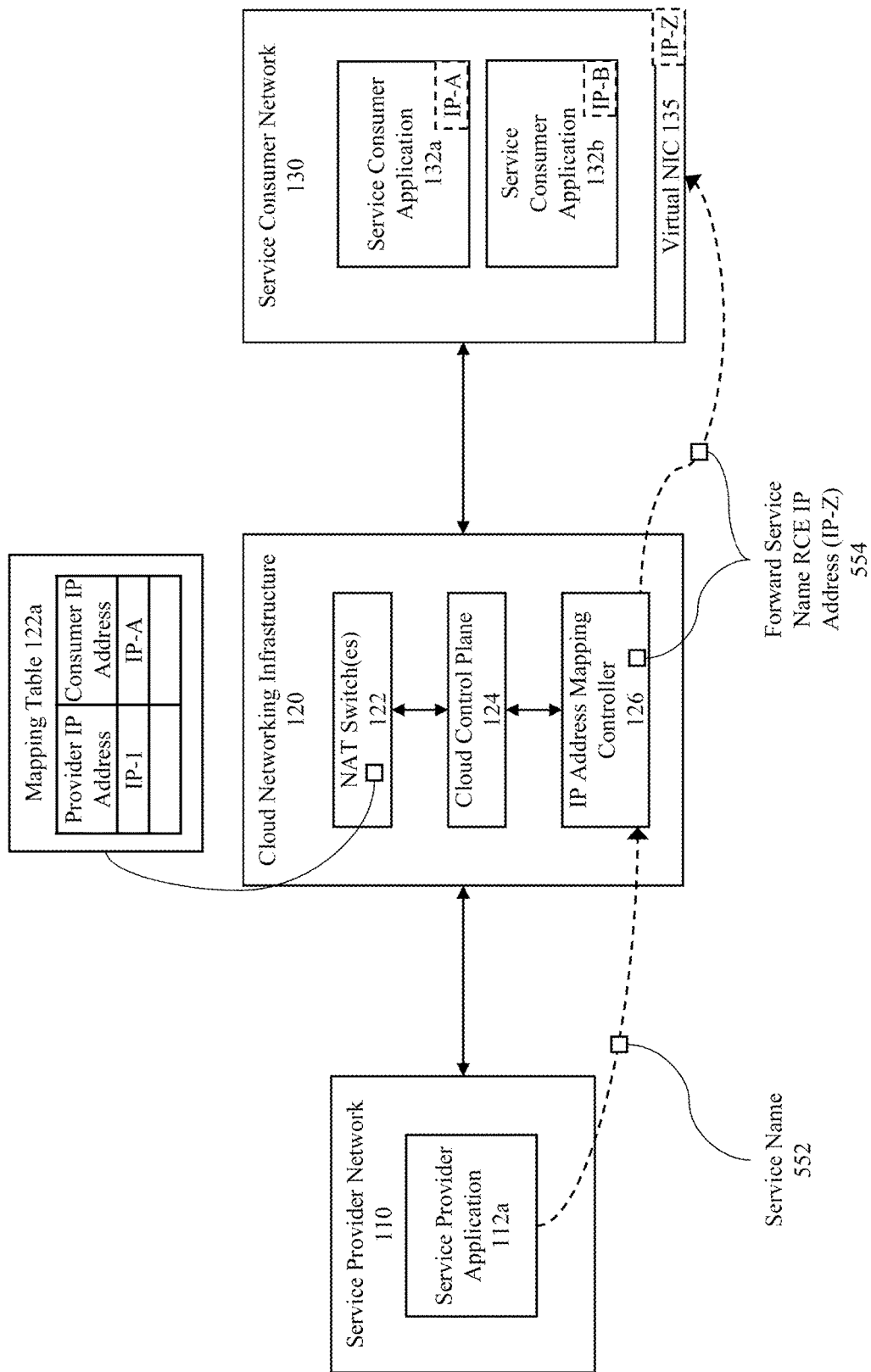

FIG. 5B includes the same arrangement of the system discussed in FIG. 5A. However, FIG. 5B illustrates a subsequent action triggered, directly or indirectly, by the request 550 discussed in regard to FIG. 5A.

Specifically, the service provider application 112a sends a request directed to a named service in the service consumer network 130 (see 552). This request is then received at the IP address mapping controller 126 and identified as being a request to setup a new connection to a service in the service consumer network. Once identified the IP address mapping controller forwards the service request to the service consumer network, including the name of the service requested, using the IP address for the virtual NIC (IP-Z) corresponding to the reverse connection endpoint (see 554).

Figure 5C:
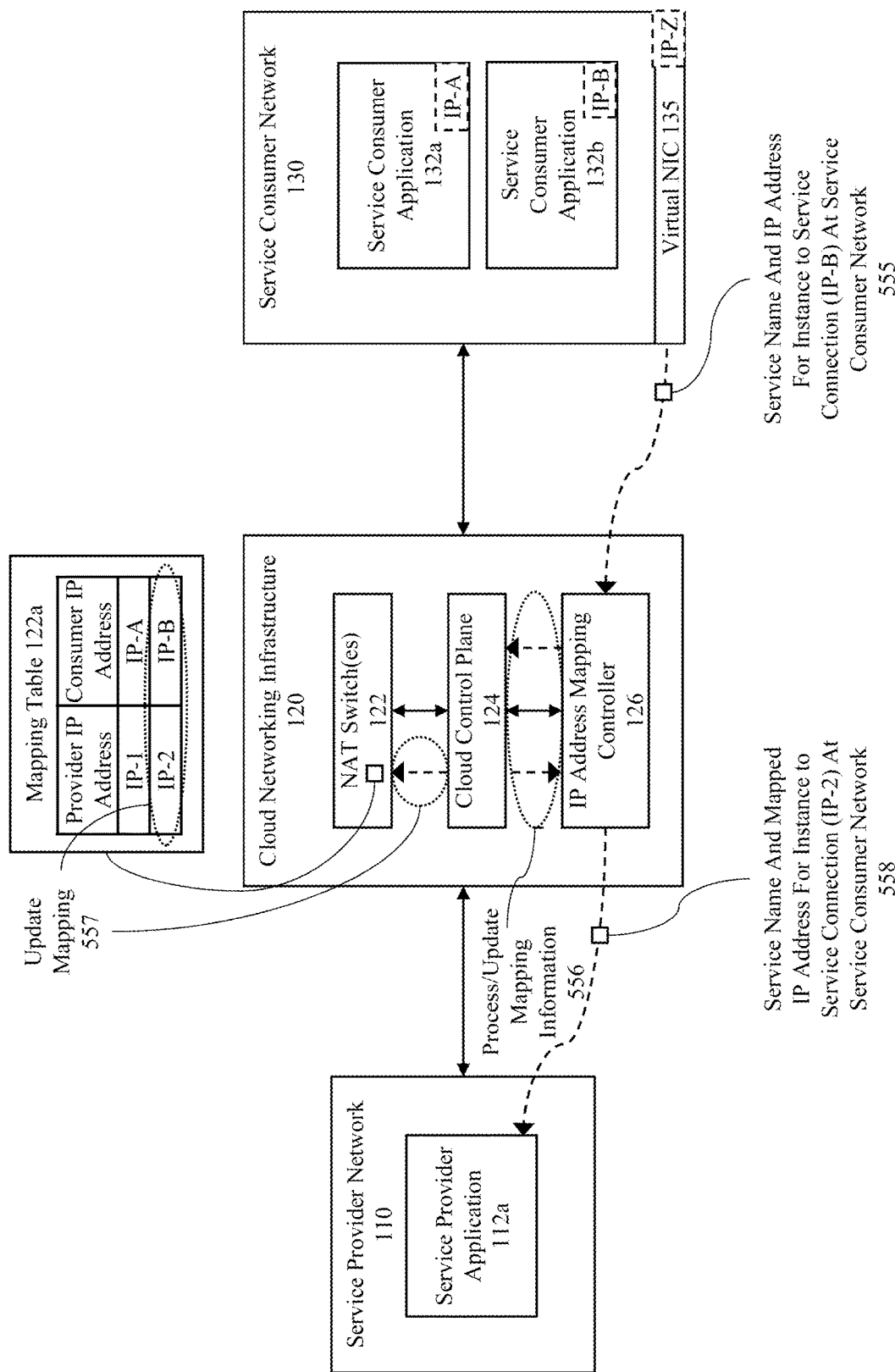

FIG. 5C includes the same arrangement of the system discussed in FIG. 5B. However, FIG. 5C illustrates a subsequent action triggered by the forwarded request 554 discussed in regard to FIG. 5B.

Specifically, the service consumer network processes the service request to identify an application instance to service the request. As illustrated here, that request is to be routed to service consumer application 132b. To illustrate, a service consumer application 132a might comprise a customer relations management application and the service consumer application 132b might comprise a database service having data relevant to processing a request from the service consumer application 132a. In some embodiments, service consumer application 132b is an instance of any number of instances of the service consumer database application, and the particular instance of the service consumer application is identified from any number of instances that provide access to a corresponding service (e.g., database service) based on a load balancing algorithm. As illustrated in this example, the service name and an IP address (IP-B) for identified instance, is returned (see 555) to the cloud networking infrastructure 120.

This information is then processed (see 556) by the IP address mapping controller 126 to interface with a cloud control plane 124 (see 554) and to cause an update to a corresponding mapping table (see 557)—e.g., by adding a mapping entry to the mapping table that maps an IP address in the service provider network to the received IP address in the service consumer network.

After the mapping has been created the service name and the mapped IP address (IP-2) in the service provider network is transmitted (see 558) to the service provider application 112a.

Figure 5D:
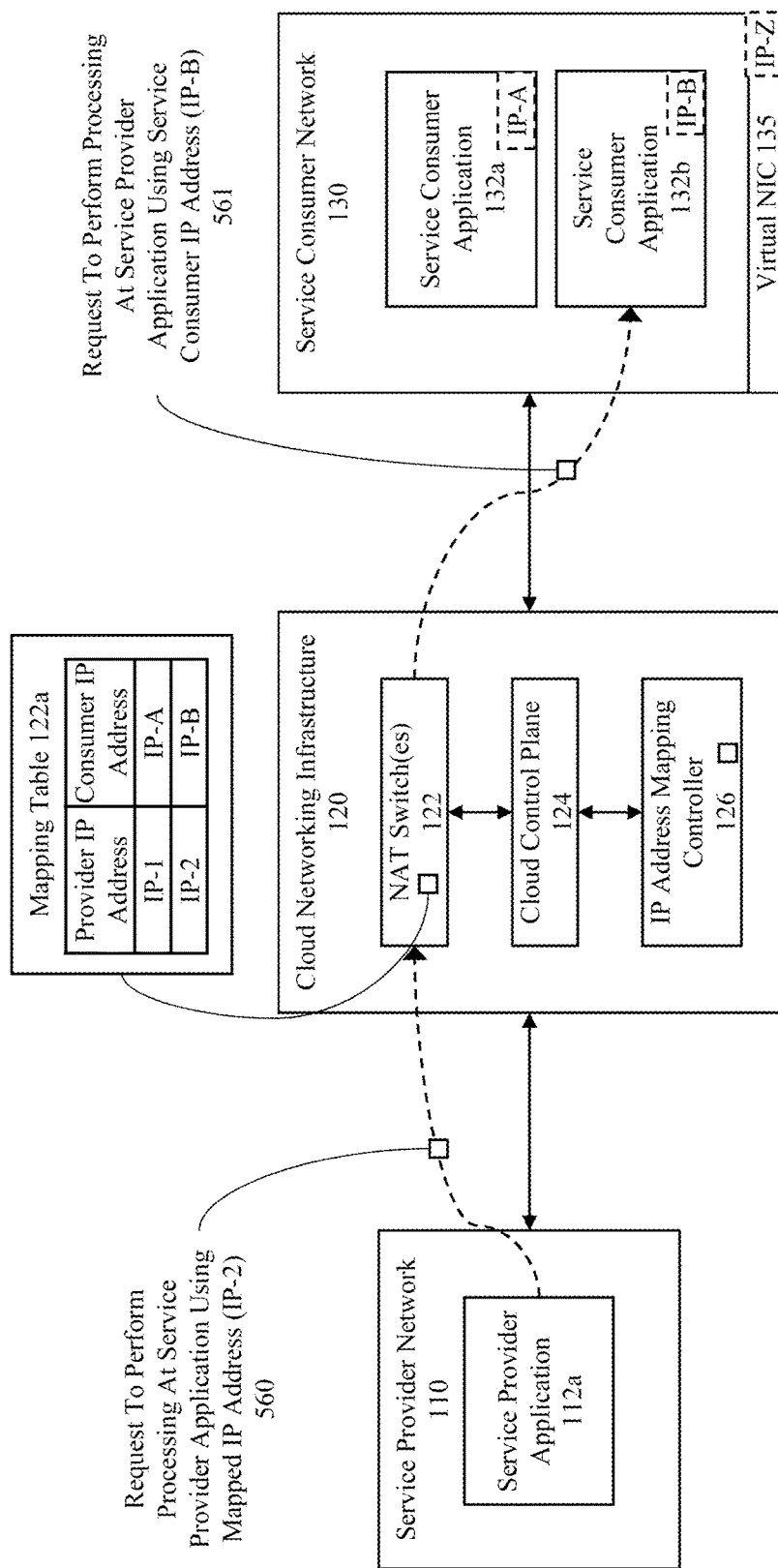

FIG. 5D includes the same arrangement of the system discussed in FIG. 5C. However, FIG. 5D illustrates a subsequent action after the mapped IP address is received at the service provider network discussed in regard to FIG. 5C.

As illustrated, once the mapped IP address is provided to the service provider application 112a and the service provider application can then exchange communications with the service consumer application 132b my passing communications through the could networking infrastructure 120.

Specifically, the service provider application 112a addresses communications to IP-2 (see 560) which are the processed by one or more network address translation switches (see 122) to route the communication to the application (132b) at the service consumer network 130 using the mapping table 122a.

System Architecture

Figure 6:
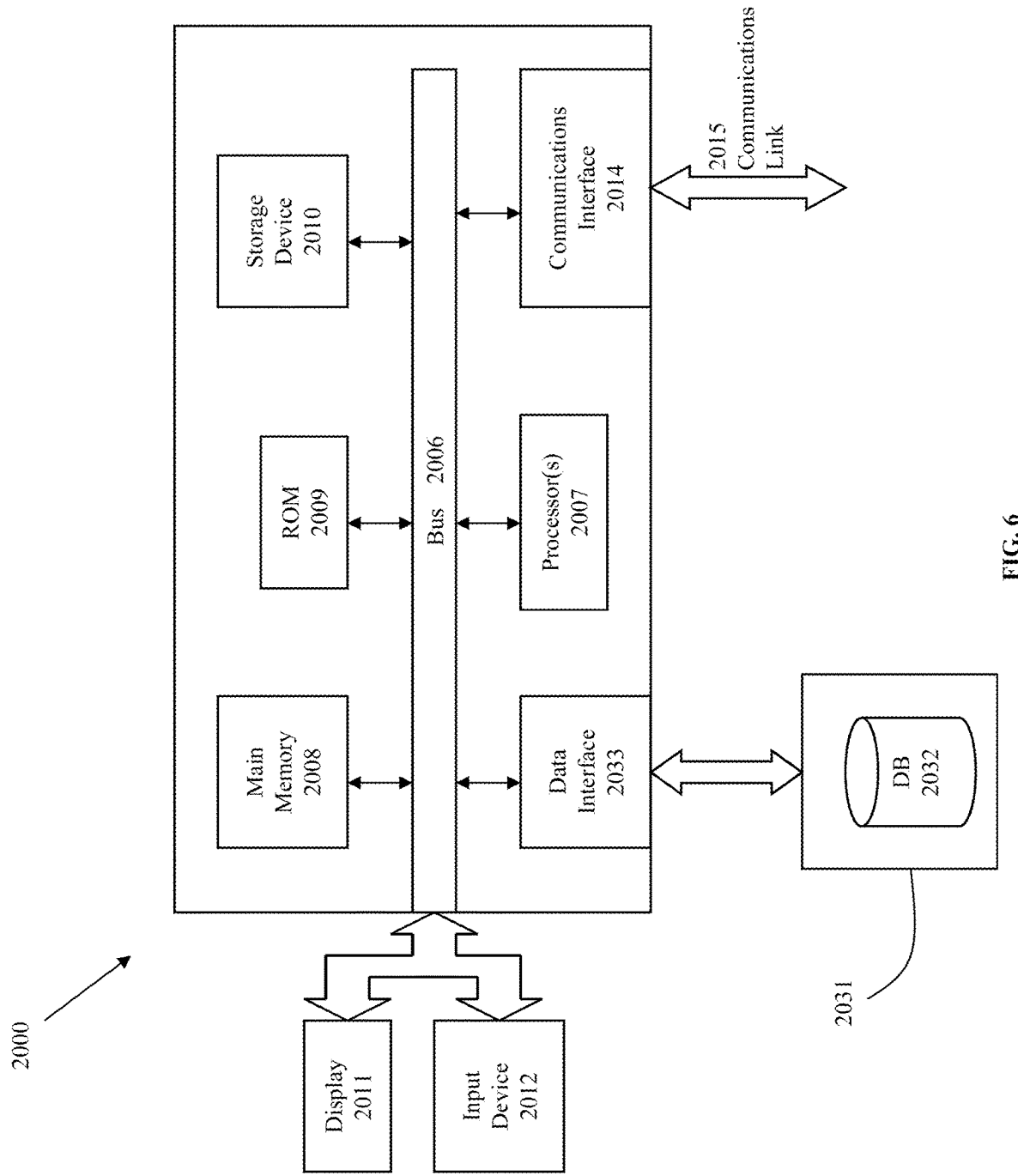
FIG. 6 is a diagram of a computing system suitable for implementing an embodiment of the present disclosure.

FIG. 6 is a block diagram of an illustrative computing system 2000 suitable for implementing an embodiment of the present invention. Computer system 2000 includes a bus 2006 or other communication mechanism for communicating information, which interconnects subsystems and devices, such as processor 2007, system memory 2008 (e.g., RAM), static storage device 2009 (e.g., ROM), disk drive 2010 (e.g., magnetic or optical), communication interface 2014 (e.g., modem or Ethernet card), display 2011 (e.g., CRT or LCD), input device 2012 (e.g., keyboard), and cursor control.

According to one embodiment of the invention, computer system 2000 performs specific operations by processor 2007 executing one or more sequences of one or more instructions contained in system memory 2008. Such instructions may be read into system memory 2008 from another computer readable/usable medium, such as static storage device 2009 or disk drive 2010. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 2007 for execution. Such a medium may take many forms, including but not limited to, non-volatile media and volatile media. Non-volatile media includes, for example, optical or magnetic disks, such as disk drive 2010. Volatile media includes dynamic memory, such as system memory 2008.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 2000. According to other embodiments of the invention, two or more computer systems 2000 coupled by communication link 2015 (e.g., LAN, PTSN, or wireless network) may perform the sequence of instructions required to practice the invention in coordination with one another.

Computer system 2000 may transmit and receive messages, data, and instructions, including program, i.e., application code, through communication link 2015 and communication interface 2014. Received program code may be executed by processor 2007 as it is received, and/or stored in disk drive 2010, or other non-volatile storage for later execution. Data may be accessed from a database 2032 that is maintained in a storage device 2031, which is accessed using data interface 2033.

FIG. 6 is a simplified block diagram of one or more components of a system environment 2100 by which services provided by one or more components of an embodiment system may be offered as cloud services, in accordance with an embodiment of the present disclosure. In the illustrated embodiment, system environment 2100 includes one or more client computing devices 2104, 2106, and 2108 that may be used by users to interact with a cloud infrastructure system 2102 that provides cloud services. The client computing devices may be configured to operate a client application such as a web browser, a proprietary client application, or some other application, which may be used by a user of the client computing device to interact with cloud infrastructure system 2102 to use services provided by cloud infrastructure system 2102.

It should be appreciated that cloud infrastructure system 2102 depicted in the figure may have other components than those depicted. Further, the embodiment shown in the figure is only one example of a cloud infrastructure system that may incorporate an embodiment of the invention. In some other embodiments, cloud infrastructure system 2102 may have more or fewer components than shown in the figure, may combine two or more components, or may have a different configuration or arrangement of components.

Figure 7:
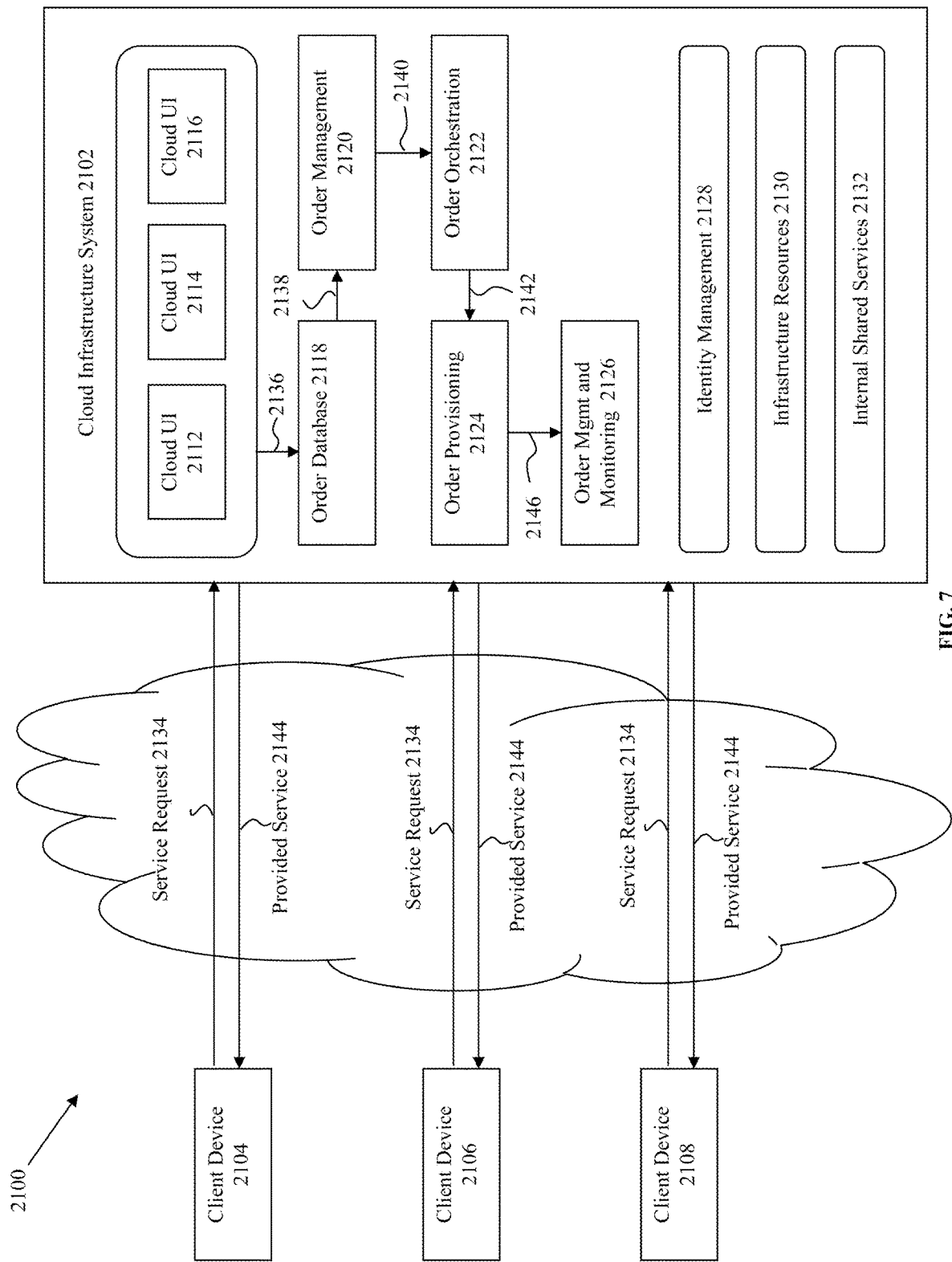
FIG. 7 is a block diagram of one or more components of a system environment in which services may be offered as cloud services, in accordance with an embodiment of the present invention.

Client computing devices 2104, 2106, and 2108 may be devices similar to those described above for FIG. 7. Although system environment 2100 is shown with three client computing devices, any number of client computing devices may be supported. Other devices such as devices with sensors, etc. may interact with cloud infrastructure system 2102.

Network(s) 2110 may facilitate communications and exchange of data between clients 2104, 2106, and 2108 and cloud infrastructure system 2102. Each network may be any type of network familiar to those skilled in the art that can support data communications using any of a variety of commercially available protocols, cloud infrastructure system 2102 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 2102 may include a suite of applications, middleware, and database service offerings that are delivered to a customer in a self-service, subscription-based, elastically scalable, reliable, highly available, and secure manner.

In various embodiments, cloud infrastructure system 2102 may be adapted to automatically provision, manage and track a customer's subscription to services offered by cloud infrastructure system 2102, cloud infrastructure system 2102 may provide the cloud services via different deployment models. For example, services may be provided under a public cloud model in which cloud infrastructure system 2102 is owned by an organization selling cloud services and the services are made available to the general public or different industry enterprises. As another example, services may be provided under a private cloud model in which cloud infrastructure system 2102 is operated solely for a single organization and may provide services for one or more entities within the organization. The cloud services may also be provided under a community cloud model in which cloud infrastructure system 2102 and the services provided by cloud infrastructure system 2102 are shared by several organizations in a related community. The cloud services may also be provided under a hybrid cloud model, which is a combination of two or more different models.

In some embodiments, the services provided by cloud infrastructure system 2102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 2102, cloud infrastructure system 2102 then performs processing to provide the services in the customer's subscription order.

In some embodiments, the services provided by cloud infrastructure system 2102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system, customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services, customers can acquire the PaaS services provided by the cloud infrastructure system without the need for customers to purchase separate licenses and support.

By utilizing the services provided by the PaaS platform, customers can employ programming languages and tools supported by the cloud infrastructure system and control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 2102 may also include infrastructure resources 2130 for providing the resources used to provide various services to customers of the cloud infrastructure system. In one embodiment, infrastructure resources 2130 may include pre-integrated and optimized combinations of hardware, such as servers, storage, and networking resources to execute the services provided by the PaaS platform and the SaaS platform.

In some embodiments, resources in cloud infrastructure system 2102 may be shared by multiple users and dynamically re-allocated per demand. Additionally, resources may be allocated to users in different time zones. For example, cloud infrastructure system 2130 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 2132 may be provided that are shared by different components or modules of cloud infrastructure system 2102 and by the services provided by cloud infrastructure system 2102. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

In certain embodiments, cloud infrastructure system 2102 may provide comprehensive management of cloud services (e.g., SaaS, PaaS, and IaaS services) in the cloud infrastructure system. In one embodiment, cloud management functionality may include capabilities for provisioning, managing, and tracking a customer's subscription received by cloud infrastructure system 2102, and the like.

In one embodiment, as depicted in the figure, cloud management functionality may be provided by one or more modules, such as an order management module 2120, an order orchestration module 2122, an order provisioning module 2124, an order management and monitoring module 2126, and an identity management module 2128. These modules may include or be provided using one or more computers and/or servers, which may be general purpose computers, specialized server computers, server farms, server clusters, or any other appropriate arrangement and/or combination.

In operation 2134, a customer using a client device, such as client device 2104, 2106 or 2108, may interact with cloud infrastructure system 2102 by requesting one or more services provided by cloud infrastructure system 2102 and placing an order for a subscription for one or more services offered by cloud infrastructure system 2102. In certain embodiments, the customer may access a cloud User Interface (UI), cloud UI 2112, cloud UI 2114 and/or cloud UI 2116 and place a subscription order via these UIs. The order information received by cloud infrastructure system 2102 in response to the customer placing an order may include information identifying the customer and one or more services offered by the cloud infrastructure system 2102 that the customer intends to subscribe to.

After an order has been placed by the customer, the order information is received via the cloud UIs, 2112, 2114 and/or 2116. At operation 2136, the order is stored in order database 2118. Order database 2118 can be one of several databases operated by cloud infrastructure system 2118 and operated in conjunction with other system elements. At operation 2138, the order information is forwarded to an order management module 2120. In some instances, order management module 2120 may be configured to perform billing and accounting functions related to the order, such as verifying the order, and upon verification, booking the order. At operation 2140, information regarding the order is communicated to an order orchestration module 2122. Order orchestration module 2122 may utilize the order information to orchestrate the provisioning of services and resources for the order placed by the customer. In some instances, order orchestration module 2122 may orchestrate the provisioning of resources to support the subscribed services using the services of order provisioning module 2124.

In certain embodiments, order orchestration module 2122 enables the management of business processes associated with each order and applies business logic to determine whether an order should proceed to provisioning. At operation 2142, upon receiving an order for a new subscription, order orchestration module 2122 sends a request to order provisioning module 2124 to allocate resources and configure those resources needed to fulfill the subscription order. Order provisioning module 2124 enables the allocation of resources for the services ordered by the customer. Order provisioning module 2124 provides a level of abstraction between the cloud services provided by cloud infrastructure system 2102 and the physical implementation layer that is used to provision the resources for providing the requested services. Order orchestration module 2122 may thus be isolated from implementation details, such as whether or not services and resources are provisioned on the fly or pre-provisioned and only allocated/assigned upon request.

At operation 2144, once the services and resources are provisioned, a notification of the provided service may be sent to customers on client devices 2104, 2106 and/or 2108 by order provisioning module 2124 of cloud infrastructure system 2102.

At operation 2146, the customer's subscription order may be managed and tracked by an order management and monitoring module 2126. In some instances, order management and monitoring module 2126 may be configured to collect usage statistics for the services in the subscription order, such as the amount of storage used, the amount data transferred, the number of users, and the amount of system up time and system down time.

In certain embodiments, cloud infrastructure system 2102 may include an identity management module 2128. Identity management module 2128 may be configured to provide identity services, such as access management and authorization services in cloud infrastructure system 2102. In some embodiments, identity management module 2128 may control information about customers who wish to utilize the services provided by cloud infrastructure system 2102. Such information can include information that authenticates the identities of such customers and information that describes which actions those customers are authorized to perform relative to various system resources (e.g., files, directories, applications, communication ports, memory segments, etc.) Identity management module 2128 may also include the management of descriptive information about each customer and about how and by whom that descriptive information can be accessed and modified.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

Additionally, the approach disclosed herein for application-level redirect trapping and creation of NAT mapping to work with routing infrastructure for private connectivity in cloud and customer networks addresses at least some of the issues of prior techniques suffer from, such as challenges introduced in cross network communication due to network isolation and access controls that do not allow public clouds or networks to initiate connections to private clouds or networks.

What is claimed is:

1. A computer-implemented method comprising:
   maintaining a plurality of service provider applications in a service provider network, the plurality of service provider applications having an IP address mapping controller instance;
   trapping a redirection message from a service consumer network at a cloud networking infrastructure layer, wherein the redirection message corresponds to a reverse connection endpoint (RCE) at the service consumer network and initiation of a connection with the service consumer network using the RCE; and
   configuring the cloud networking infrastructure layer to route corresponding communications to the service consumer network.

2. The computer-implemented method of claim 1, wherein initiation of the connection with the service consumer network using the RCE is in response to a request received from a corresponding service provider application of the plurality of service provider applications in a service provider network.

3. The computer-implemented method of claim 1, wherein the redirection message includes a service IP address in the service consumer network that is different from an IP address for the RCE.

4. The computer-implemented method of claim 3, wherein configuring the cloud networking infrastructure layer to route corresponding communications to the service consumer network comprises at least updating a network address translation table to include a mapping between a mapped IP address and the service IP address.

5. The computer-implemented method of claim 4, wherein a service provider application in a service provider network exchanges one or more messages with a service consumer application using the mapped IP address.

6. The computer-implemented method of claim 4, wherein the mapped IP address is returned to the service provider application.

7. The computer-implemented method of claim 1, wherein the service consumer network comprises a private cloud or network and a service provider network comprises a public cloud or network.

8. A non-transitory computer readable medium having stored thereon a sequence of instructions which, when executed by a processor causes a set of acts comprising:
   maintaining a plurality of service provider applications in a service provider network, the plurality of service provider applications having an IP address mapping controller instance;
   trapping a redirection message from a service consumer network at a cloud networking infrastructure layer, wherein the redirection message corresponds to a reverse connection endpoint (RCE) at the service consumer network and initiation of a connection with the service consumer network using the RCE; and
   configuring the cloud networking infrastructure layer to route corresponding communications to the service consumer network.

9. The non-transitory computer readable medium of claim 8, wherein initiation of the connection with the service consumer network using the RCE is in response to a request received from a corresponding service provider application of the plurality of service provider applications in a service provider network.

10. The non-transitory computer readable medium of claim 8, wherein the redirection message includes a service IP address in the service consumer network that is different from an IP address for the RCE.

11. The non-transitory computer readable medium of claim 10, wherein configuring the cloud networking infrastructure layer to route corresponding communications to the service consumer network comprises at least updating a network address translation table to include a mapping between a mapped IP address and the service IP address.

12. The non-transitory computer readable medium of claim 11, wherein a service provider application in a service provider network exchanges one or more messages with a service consumer application using the mapped IP address.

13. The non-transitory computer readable medium of claim 11, wherein the mapped IP address is returned to the service provider application.

14. The non-transitory computer readable medium of claim 8, wherein the service consumer network comprises a private cloud or network and a service provider network comprises a public cloud or network.

15. A computing system comprising:
   a memory to hold a set of instructions;
   a computer processor to execute the set of instructions, which when executed cause a set of acts comprising:
      maintaining a plurality of service provider applications in a service provider network, the plurality of service provider applications having an IP address mapping controller instance;
      trapping a redirection message from a service consumer network at a cloud networking infrastructure layer, wherein the redirection message corresponds to a reverse connection endpoint (RCE) at the service consumer network and initiation of a connection with the service consumer network using the RCE; and
      configuring the cloud networking infrastructure layer to route corresponding communications to the service consumer network.

16. The computing system of claim 15, wherein initiation of the connection with the service consumer network using the RCE is in response to a request received from a corresponding service provider application of the plurality of service provider applications in a service provider network.

17. The computing system of claim 15, wherein the redirection message includes a service IP address in the service consumer network that is different from an IP address for the RCE.

18. The computing system of claim 17, wherein configuring the cloud networking infrastructure layer to route corresponding communications to the service consumer network comprises at least updating a network address translation table to include a mapping between a mapped IP address and the service IP address.

19. The computing system of claim 18, wherein a service provider application in a service provider network exchanges one or more messages with a service consumer application using the mapped IP address, and the mapped IP address is returned to the service provider application.

20. The computing system of claim 15, wherein the service consumer network comprises a private cloud or network and a service provider network comprises a public cloud or network.

* * * * *